Feb. 24, 1942.   L. R. FINK   2,274,596
FISHING PLUG
Filed Sept. 25, 1939
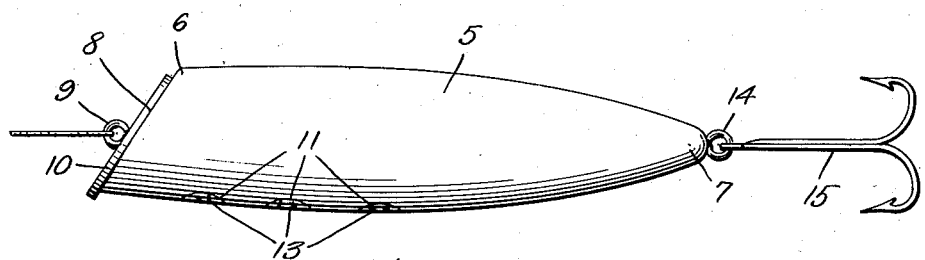
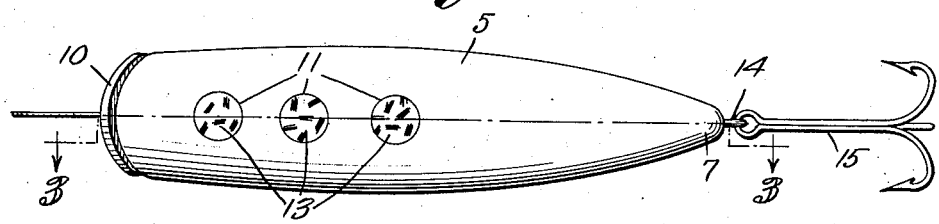
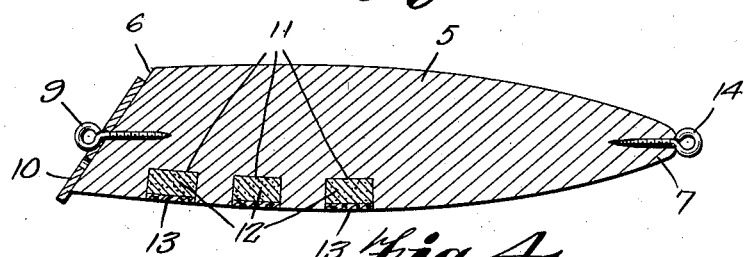
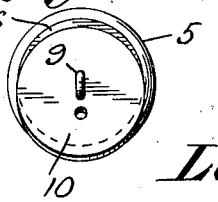
Louis R. Fink,
INVENTOR Patented Feb. 24, 1942

2,274,596

UNITED STATES PATENT OFFICE 2,274,596

FISHING PLUG

Louis Richard Fink, Santa Rita, Mont.

Application September 25, 1939, Serial No. 296,486

1 Claim. (Cl. 43—46)

My invention relates to artificial bait and has as one of the principal objects thereof the provision of a device of the plug type so constructed and arranged as to maintain said device in a predetermined position with respect to horizontality when in the water.

Another object of my invention is to provide a device of the above described character which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a side elevation of my invention.

Figure 2 is a bottom plan view thereof.

Figure 3 is a sectional view taken on the line 3—3 of Figure 2.

Figure 4 is an end elevation.

In practicing my invention, as illustrated in the drawing, I provide an elongated body 5, the oppositely disposed ends of which constitute the head and tail 6 and 7 respectively. The head 6 is formed with an upwardly and inwardly extending flat face 8 having secured thereto, by means of a screw eye 9, a protective metal disk 10 as clearly illustrated in the drawing. The under face of the body 5, in proximity to the head 6, is fashioned with a plurality of inwardly extending sockets or cul-de-sacs 11 in which are contained metal weights 12, for instance lead plugs. The weights 12 are maintained within the sockets 11 by means of cork closure disks 13 or the like. Said weights are disposed between the head and the central portion of the body as clearly illustrated in Figure 3 of the drawing whereby when the body is at rest in the water the head is inclined downwardly, thereby disposing the tail end upwardly. The tail 7 has secured thereto a screw eye 14 to which is attached the front end of a fish hook 15 provided with a plurality of prongs.

My device as herein set forth and described is especially useful for catching mackinaw or lake trout for the reason that fish of this type habitate in proximity to the bottom of the body of water and which is usually of a rocky nature. Obviously, with the head of the plug disposed downwardly, the tail maintains the hook 15 above the bottom and rocks thereon, thereby precluding engagement of the hook with the rocks and bottom.

By thus being able to position a hook upwardly with respect to the head, the barbs are protected from becoming dull by engagement with the rocks and the disk 10 serves to protect the head from engagement with the rocks. It is to be understood that the body 5 is constructed of wood or other suitable like material to impart buoyancy to the same. Furthermore, it will be noted that my herein described invention is an improvement over that disclosed in United States Letters Patent No. 2,134,330 granted to me on October 25, 1938.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

An artificial bait comprising an elongated longitudinally tapered plug body having the front relatively large end shaped to provide a flat angular head face, a hook pivotally connected to the reduced rear end portion of the body, a flat disk having a diameter corresponding to the diameter of the front face of the body positioned flat against the said face, the said plate having a plurality of apertures therethrough, a line attaching eye having a screw shank extended through an aperture in the plate and threaded longitudinally into the body through the front face thereof in a central position, the said apertures in the plate enabling adjustment of the latter to eccentric mounting on the front face, the bottom of the said body being provided with three longitudinally spaced sockets disposed between the transverse center of the body and the front face thereof, a metallic weight member fitted within each of the said sockets, and a cork disk fitted in flush arrangement in the outer end of each socket releasably holding the metallic weight therein.

LOUIS RICHARD FINK.